United States Patent
Lin et al.

(10) Patent No.: US 7,530,712 B2
(45) Date of Patent: May 12, 2009

(54) REFLECTIVE ILLUMINATION DEVICE (75) Inventors: Jian-Shian Lin, Yilan (TW);
Jian-Chiuan Wang, Xindian (TW);
Chieh-Lung Lai, Taiping (TW);
Hsiu-Chen Hsu, Tainan (TW); Yi-Ting Sun, Taipei (TW)

(73) Assignees: Industrial Technology Research Institute, Hsinchu (TW); Toalux Electric Corp., Changhua (TW)

( * ) Notice: Subject to any disclaimer, the term of this patent is extended or adjusted under 35 U.S.C. 154(b) by 0 days.

(21) Appl. No.: 11/490,175

(22) Filed: Jul. 21, 2006

(65) Prior Publication Data
US 2007/0217193 A1 Sep. 20, 2007

(30) Foreign Application Priority Data
Mar. 17, 2006 (TW) .............................. 95109114 A
Jun. 13, 2006 (TW) .............................. 95120911 A (51) Int. Cl.
*F21V 7/00* (2006.01)
(52) U.S. Cl. ........................ 362/247; 362/327; 362/346
(58) Field of Classification Search ................ 362/237, 362/240, 241, 243, 247, 297, 298, 301, 302, 362/304, 327, 330, 337, 340, 346
See application file for complete search history.

(56) References Cited

U.S. PATENT DOCUMENTS

| | | | | |
|---|---|---|---|---|
| 4,042,821 A * | 8/1977 | Mierzwinski | ................ | 362/216 |
| 4,929,866 A * | 5/1990 | Murata et al. | ................ | 362/297 |
| 5,136,483 A | 8/1992 | Schoniger et al. | ........... | 362/545 |
| 5,477,440 A * | 12/1995 | Brun | .......................... | 362/346 |
| 5,838,247 A | 11/1998 | Bladowski | ............. | 340/815.45 |
| 6,474,852 B1 * | 11/2002 | Ohkohdo et al. | ............ | 362/237 |
| 6,502,956 B1 | 1/2003 | Wu | .............................. | 362/237 |
| 6,871,993 B2 | 3/2005 | Hecht | ......................... | 362/555 |
| 2003/0035298 A1 | 2/2003 | Amano | ....................... | 362/518 |
| 2003/0043593 A1 | 3/2003 | Amano | ....................... | 362/545 |

FOREIGN PATENT DOCUMENTS

| | | |
|---|---|---|
| CN | 1737194 | 2/2006 |
| JP | 2002221605 | 8/2002 |
| JP | 2003114430 | 4/2003 |
| TW | 581847 | 4/2004 |
| TW | 1228745 | 3/2005 |
| TW | 1241139 | 10/2005 |
| TW | 1249588 | 2/2006 |

* cited by examiner

*Primary Examiner*—Y My Quach Lee
(74) *Attorney, Agent, or Firm*—WPAT, P.C.; Justin King (57) ABSTRACT

A reflective illumination device is disclosed, which is comprised of a light-guiding screen with light reflecting ability and at least a directional light source; wherein the light-guiding screen includes a reflecting surface having a semi-Fresnel lens structure arranged thereon. The semi-Fresnel lens structure, being designed basing on the principle of Fresnel lens, is the equivalent of a parabolic mirror that has spiral cut ridges for focusing light to a focal point, whereas the profile of the ridges can be a planar surface, a curved surface or the combination thereof. By arranging the reflecting surface with semi-Fresnel lens structure at the bottom of the light-guiding screen and each light source at a circumferential side wall of the light-guiding screen, the light beams emitting from each light source can be reflected out of the light-guiding screen by a specific angle as the direction of the light beams is adjusted to pour on the semi-Fresnel lens structure by a specific angle matching the configuration of the same.

14 Claims, 7 Drawing Sheets

REFLECTIVE ILLUMINATION DEVICE

FIELD OF THE INVENTION

The present invention relates to a reflective illumination device, and more particularly, to a highly efficient illumination device having a reflecting surface with semi-Fresnel lens structure, being designed basing on the principle of Fresnel lens and being the equivalent of a parabolic mirror, in which the direction of the light beams emitted from each light source of the illumination device is adjusted to pour on the semi-Fresnel lens structure by a specific angle so as to be reflected thereby while enabling the illumination device to discharge highly collimated parallel light beams.

BACKGROUND OF THE INVENTION

Generally, the light sources of conventional luminaires usually can be sorted into two categories, which are point sources such as incandescent bulb and energy-saving fluorescent bulb, and line source such as fluorescent tube. These two types of light source are all capable of discharging light beams in a radiation manner. However, as the sizes of these two light sources are considered too large while comparing with that of light emitting diode (LED), LED has been intensely studied and becoming the main trend of future luminaires as the luminous efficiency of LEDs is enhancing continuously and unceasingly. Since LED is considered to be a flat light source as it can only discharge light beams through the light emitting surface thereof, it can only provide a limited angle of light and thus most LED luminaires are adopting either bottom-lighting module or reflective module. In addition, as the brightness of a single LED currently available is still not sufficient to be used as the sole and only light source of modern luminaires, a plurality of LEDs are clustered into a lighting module for proving sufficient luminance.

Figure 1:
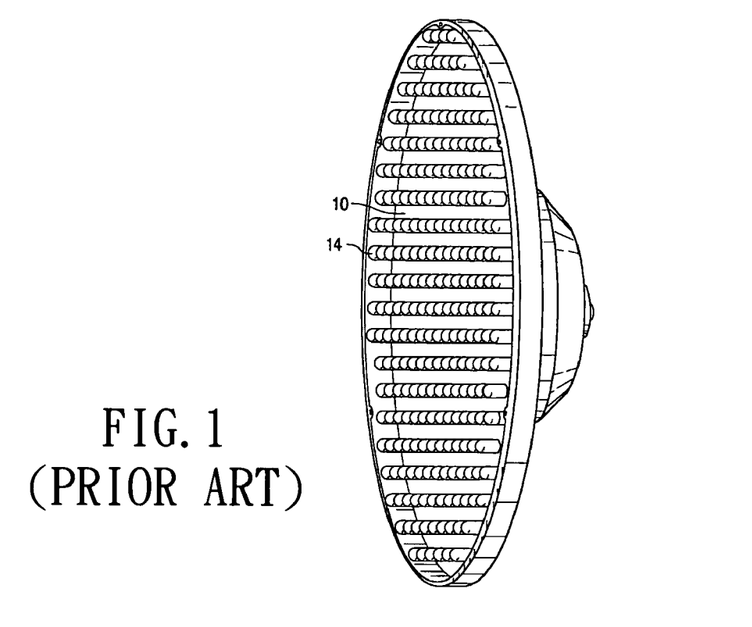
FIG. 1 is a bottom-lighting LED luminaire disclosed in U.S. Pat. No. 6,502,956.

Please refer to FIG. 1, which is a bottom-lighting LED luminaire disclosed in U.S. Pat. No. 6,502,956, entitled "Light emitting diode lamp with individual LED lenses". Although the bottom-lighting LED luminaire of FIG. 1 has a plurality of LEDs 14 arranged on a printed circuit board (PCB) 10 that the luminance is enhanced, it is prone to cause severe glare causing discomfort to viewers. Furthermore, if any individual LED or portion of the plural LEDs is damaged, the damaged LEDs are visible and apparent.

Figure 2:
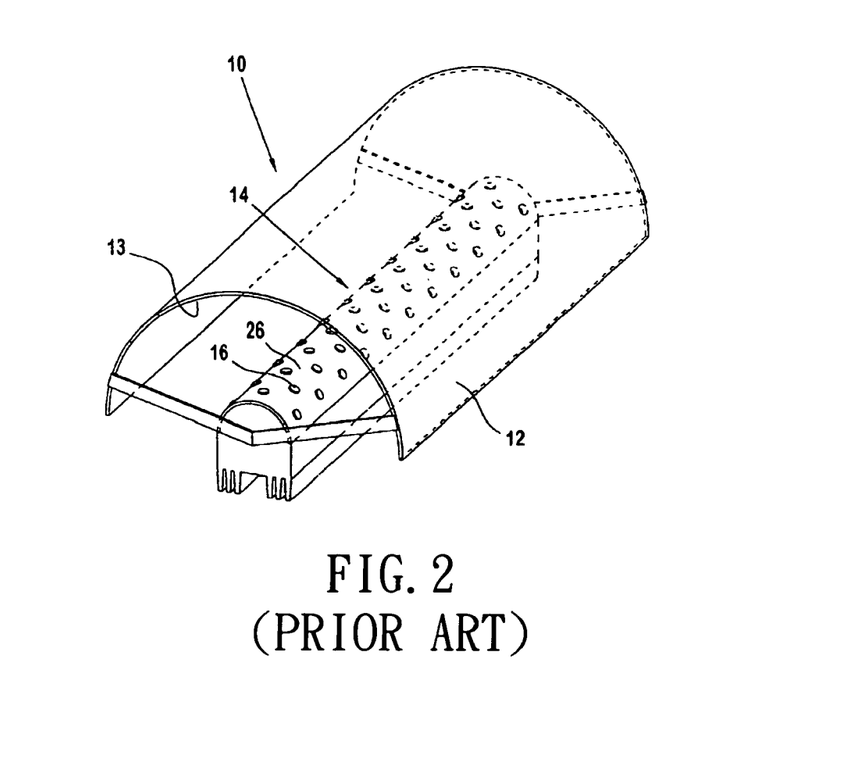
FIG. 2 is an illumination system for use with machine vision systems disclosed in U.S. Pat. No. 6,871,993.

Please refer to FIG. 2, which is an illumination system for use with machine vision systems disclosed in U.S. Pat. No. 6,871,993, entitled "Integrating LED illumination system for machine vision systems". The illumination system is specifically adapted to be used in optical and barcode scanning systems for focusing light on a line or area in which a machine vision system collects image data. As seen in FIG. 2, the illumination system comprises a reflector 12 and an LED array 14. The reflector 12 includes a focusing reflective surface 13 that is concave in shape. An elliptical cross-sectional shape is preferred, but other shapes, such as parabolic and hyperbolic could be used, for example. The LED array 14 comprises a substrate 26 and a plurality of LEDs 16 mounted on the substrate 26. Each of the plurality of LEDs is positioned in the focal region of the reflector 12 while enabling the same to emit light toward the focusing reflective surface 13. As the primary objective of thus illumination system is to focus light emitted from the plural LEDs 16 toward the illumination area, that it is suitable to be applied in barcode scanning system, but not suitable to be used as luminaire.

Figure 3:
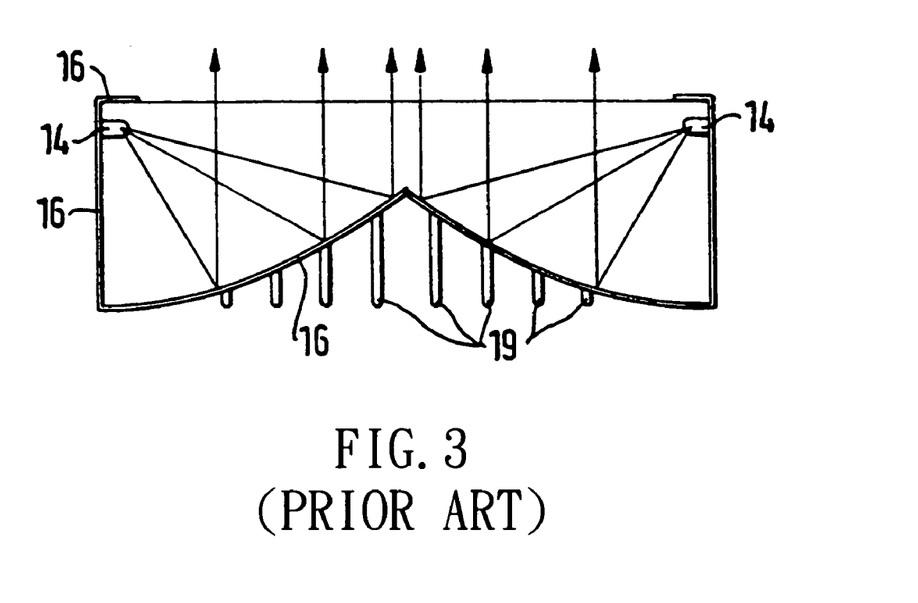
FIG. 3 is an illuminating device for use as a headlamp disclosed in U.S. Pat. No. 5,136,483.

Please refer to FIG. 3, which is an illuminating device for use as a headlamp disclosed in U.S. Pat. No. 5,136,483, entitled "Illuminating device". The illuminating device of FIG. 3 is comprised of: a reflecting screen 16; a plurality of LEDs, being fitted flatly onto the circumferential edge of the reflecting screen 16; and a plurality of heat dissipating fins 19; wherein the light emitting from each LED 14 is reflected by the inwardly concave reflecting screen 16 and thus being discharged out of the illuminating device parallelly. As each of the plural LEDs 14 is arranged flatly on the circumferential edge of the reflecting screen 16, only a portion of light emitted therefrom within a specific angle can be reflected by the reflecting screen 16 and discharged out of the illuminating device parallelly, while some other light emitted therefrom not within such specific angle are reflected and discharged in a scattering manner and even some other light emitted therefrom not within such specific angle are reflected inside the reflecting screen 16 repetitively without being discharged. As the result, not only the luminance of the illuminating device is adversely affected, but also no highly collimated parallel light beams can be discharged out of the illuminating device. Although the forgoing shortcomings can be overcome by improving the design of the reflecting screen 16, it is highly difficult to implement and, in particular, would introduce not much improvement.

Figure 4:
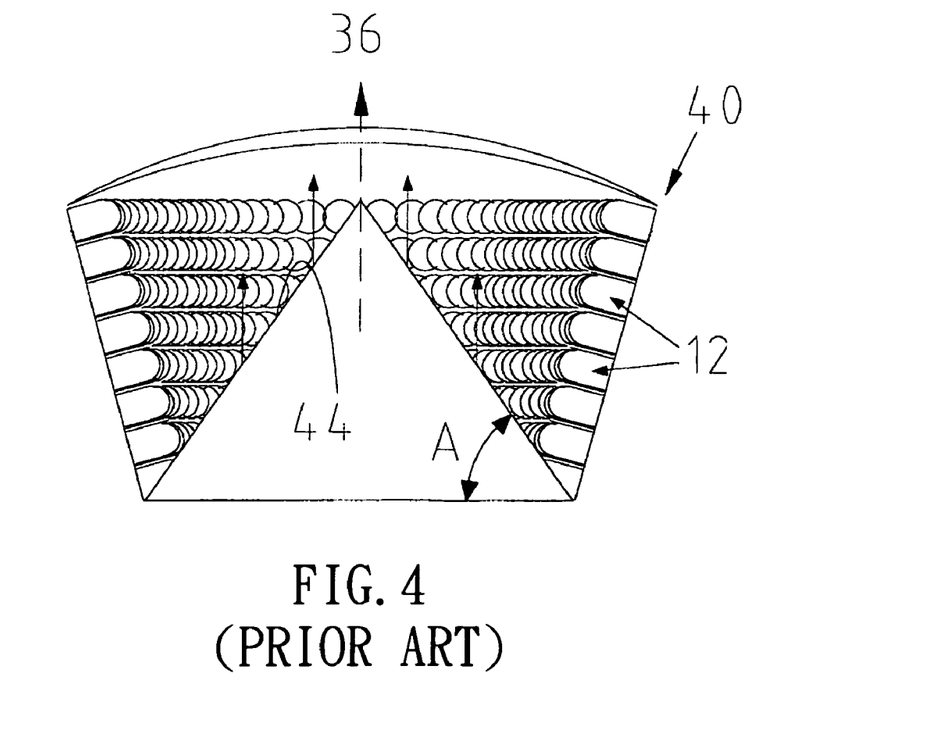
FIG. 4 is a lamp disclosed in U.S. Pat. No. 5,838,247.

Please refer to FIG. 4, which is a lamp disclosed in U.S. Pat. No. 5,838,247, entitled "Solid state lighting system". The lamp 40 of FIG. 4 is comprised of: an inclined array of LEDs 12; and a reflector 44 inclined at a complementary angle A. It will be understood that the array may be the inverse, i.e. convergently inclined; and conical or pyrimidal. The angle of convergence or divergence may vary, with the angle of the reflector 44 correspondingly selected to achieve the desired direction and type (e.g. focussed or diffused) of light output, and thus to direct the light parallel to the polar axis 36 of lamp 40. Nevertheless, the lamp 40 is still short in that as the reflector 44 is a planar surface which can not match perfectly with the light emitting angles of those LEDs 12, not all the light reflected by the reflector 44 can be discharged parallel to the polar axis 36. Furthermore, since the reflector 44 is inclined, a comparatively large amount of LEDs 12 are required for illuminating similar luminance so that not only the lamp 40 is costly and not power-saving, but also it is bulky and has no surprising appearance.

SUMMARY OF THE INVENTION

In view of the disadvantages of prior art, the primary object of the present invention is to provide a highly efficient reflective illumination device having a reflecting surface, being the equivalent of a parabolic mirror, in which the direction of the light beams emitted from each light source of the illumination device is adjusted to pour on the reflecting surface by a specific angle so as to be reflected thereby while enabling the illumination device to discharge highly collimated parallel light beams.

It is another object of the present invention to provide a reflective illumination device with high illuminance.

It is yet another object of the present invention to provide a reflective illumination device having a light-guiding screen that the shape of the light-guiding screen can be varied at will.

It is further another object of the present invention to provide a reflective illumination device capable of preventing glare.

To achieve the above objects, the present invention provides a reflective illumination device, comprising:

a light-guiding screen, having a reflecting surface with a semi-Fresnel lens structure arranged thereon; and
  at least a light source;

wherein, by positioning each light source at position in the focal region of the semi-Fresnel lens structure of the light-guiding screen while adjusting the angle of light beam emitted form each light source with respect to the corresponding configuration of the semi-Fresnel lens structure, the light beams emitting from each light source can be reflected out of the illumination device by a specific angle as the direction of the light beams is adjusted to pour on the semi-Fresnel lens structure by a specific angle matching the corresponding configuration of the same.

Preferably, the angle of light beam emitted form each light source is independently adjusted to match with its corresponding configuration of the semi-Fresnel lens structure, and thus the light beams emitting from different light source can be reflected out of the illumination device by different angles in respective, i.e. the light beams are reflected out of the light-guiding screen by at least one angle.

Preferably, the light-guiding screen is made of a material of light reflecting ability.

Preferably, a light reflecting layer is disposed at the inner wall of the light-guiding screen.

Preferably, the light reflecting layer is a reflective diffusion film.

Preferably, the light reflecting layer is formed by an electro-depositing layer of metal, such as aluminum or electroless nickel, etc.

Preferably, as the semi-Fresnel lens structure is a structure having a plurality of ridges, the profile of each ridge can be a planar surface, a curved surface or the combination thereof.

Preferably, the plural ridges of the semi-Fresnel lens structure are spirally arranged surrounding a pseudo-center.

Preferably, the plural ridges of the semi-Fresnel lens structure are symmetrically arranged with respect to a pseudo-axis.

Preferably, the plural ridges of the semi-Fresnel lens structure are extending while parallel to each other.

Preferably, the profile of the reflecting surface is a formation of at least two inclined planar surfaces being symmetrically arranged with respect to a pseudo-axis while the semi-Fresnel lens structure is formed on these inclined planar surfaces.

Preferably, the profile of the reflecting surface is a formation of at least two inclined curve surfaces being symmetrically arranged with respect to a pseudo-axis while the semi-Fresnel lens structure is formed on these inclined curve surfaces.

Preferably, the profile of the reflecting surface is a formation of at least an inclined planar surface and at least an inclined curve surface, being symmetrically arranged with respect to a pseudo-axis, while the semi-Fresnel lens structure is formed on the two inclined surfaces.

Preferably, each light source is a directional light source.

Preferably, each light source is a light emitting diode.

Preferably, the light-guiding screen further comprises:
a bottom, for disposing the reflecting surface having the semi-Fresnel lens structure arranged thereon; and
at least a side wall, arranged surrounding the circumference of the bottom for enabling each light source to be fitted thereon.

Preferably, the side wall is arranged to surround the circumference of the bottom while enabling the light-guiding screen to have a polygonal contour.

Preferably, the side wall is arranged to surround the circumference of the bottom while enabling the light-guiding screen to have a circular contour.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 5:
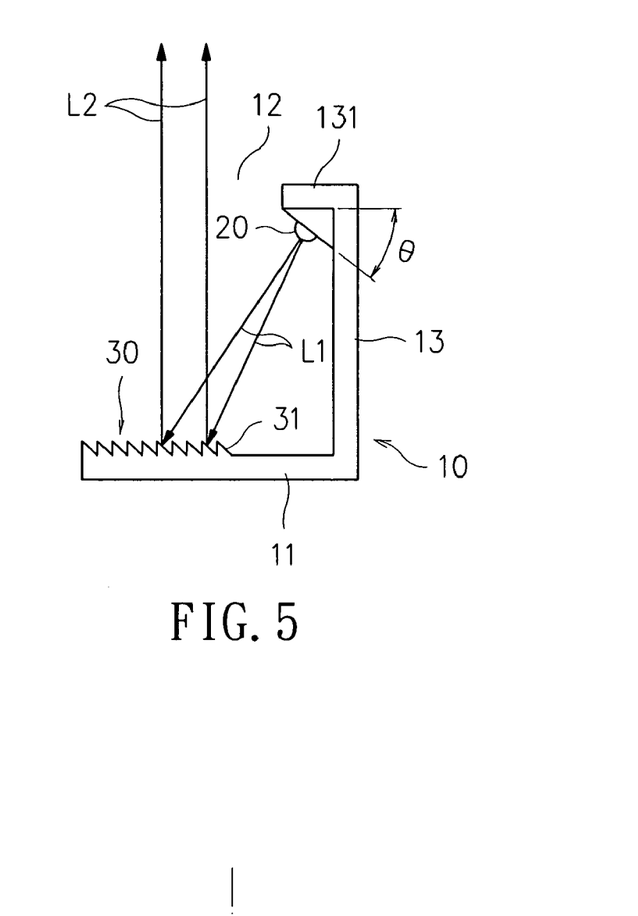
FIG. 5 is a schematic diagram illustrating a reflective illumination device according to a first embodiment of the invention.

Please refer to FIG. 5, which is a schematic diagram illustrating a reflective illumination device according to a first embodiment of the invention. The illumination device of FIG. 5 is comprised of a light-guiding screen 10, made of a material of light reflecting ability, and at least a light source 20; wherein a light reflecting layer is disposed at the inner wall of the light-guiding screen 10 for increasing the reflectance of the light-guiding screen 10. The light reflecting layer can be a reflective diffusion film, commonly seen in conventional flat panel display, or can be formed by electro-depositing a layer of metal, such as aluminum or electroless nickel, etc. Each light source 20 can be a directional light source capable of emitting light beams by a specific angle, such as light emitting diode (LED). Moreover, the light-guiding screen 10 has a bottom 11 and at least a light-discharging exit 12 formed by the enclosure of a side wall. As seen in FIG. 5, the illumination device is characterized in that: a semi-Fresnel lens structure 30 is arranged at the bottom 11 of the light-guiding screen 10. As the semi-Fresnel lens structure 30 is a structure having a plurality of ridges 31, the profile of each ridge can be a planar surface of various inclination angles, a curved surface of various curvatures or the combination thereof. In this preferred embodiment, each light source 20 is inclined by an angle θ and disposed at the upper fringe of side wall enclosing the light-discharging exit 12 for enabling the light beams of the light source to be emitted by a specific angle, such that the light beams L1 respectively can pour on the ridge of the semi-Fresnel lens structure 30 corresponding thereto while being reflected thereby and discharged out of the light-guiding screen 10 parallelly, and thus the illuminance of the reflective illumination device can be improved.

Figure 5A:
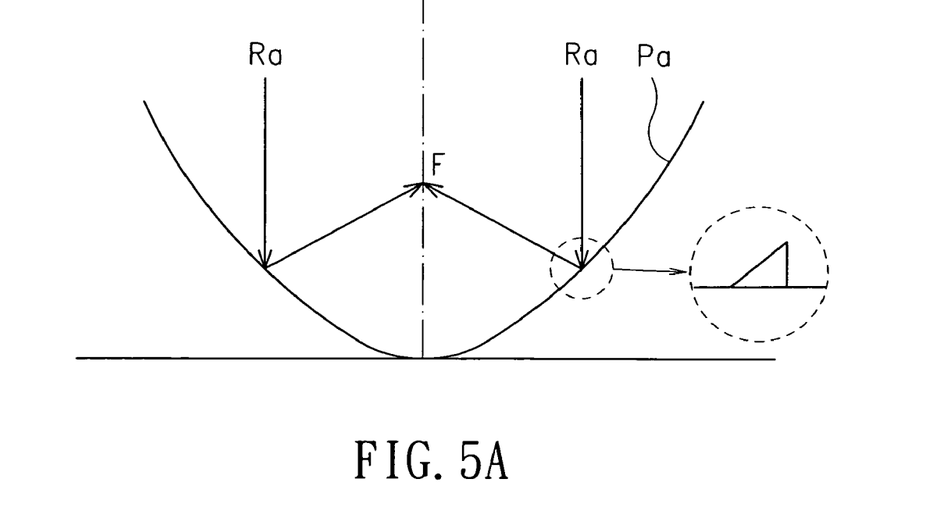
FIG. 5A is a schematic view showing the focusing of light reflected by a parabolic mirror.

The aforesaid light source 20 and each ridge 31 of the semi-Fresnel lens structure 30 are designed based on the principle of reflection, that is, the angle of a light beam encountered a surface is equal to an angle of the light beam being reflected by the surface. For clarity, as seen in FIG. 5A, as a paraxial ray Ra is directed to encounter a concave parabolic mirror Pa and is parallel to the axis of the mirror Pa, the reflected light of the paraxial ray Ra will focus on the focal point of the parabolic mirror Pa. Therefore, a prism equivalent to the parabolic mirror Pa can be obtained by a calculation performed by a Matrix Laboratory (Matlab) software based upon the curvature of the parabolic mirror, whereas the obtained prism is a Fresnel mirror that can be adopted as the semi-Fresnel structure 30 as shown in FIG. 5. By positioning each light source 20 at a position in the focal region of—it's a corresponding ridge 31 of the semi-Fresnel lens structure 30 and adjusting the angle of the light beam emitted form each light source 20 with respect to each corresponding ridge 31 of the semi-Fresnel lens structure 30, the light beams emitting from each light source 20 can be reflected out of the illumination device at a specific angle in a parallel manner as the direction of the light beams is adjusted to reflect on the semi-Fresnel lens structure 30 at a specific angle matching the corresponding ridge 31.

In addition, the position of each light source 20 is dependent on the position of the corresponding light-discharging exit and the construction of its corresponding semi-Fresnel lens structure 30, that is not limited to the upper fringe of the side wall. Thus, the shape and formation of the light-guiding screen 10 can be varied with respect to the positioning of the light source 20 and the semi-Fresnel lens structure 30, while the formation and shape of the light-guiding screen 10 shown in FIG. 5 is only employed as illustration.

The basic idea behind a Fresnel lens is simple. Imagine taking a plastic magnifying glass lens and slicing it into a hundred concentric rings (like the rings of a tree). Each ring is slightly thinner than the next and focuses the light toward the center. Now take each ring, modify it so that it's flat on one side, and make it the same thickness as the others. To retain the rings' ability to focus the light toward the center, the angle of each ring's angled face will be different. Now if you stack all the rings back together, you have a Fresnel lens. You can make the lens extremely large if you like. Large Fresnel lenses are often used as solar concentrators. By the principle of the aforesaid Fresnel lens, a semi-Fresnel lens structure can be constructed, by which the direction of the light beams emitted from each light source of a reflective illumination device is adjusted to pour on the semi-Fresnel lens structure by a specific angle so as to be reflected thereby while enabling the illumination device to discharge highly collimated parallel light beams.

Figure 6:
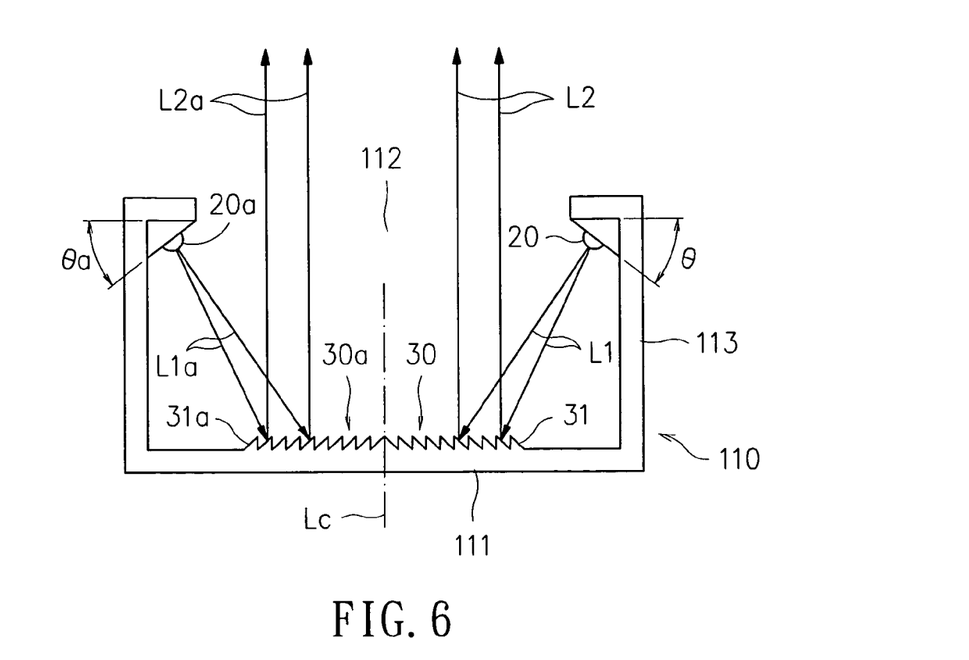
FIG. 6 is a schematic diagram illustrating a reflective illumination device according to a second embodiment of the invention.

Similar to that shown in FIG. 5, another reflective illumination device is configured, as shown in FIG. 6. In FIG. 6, the light-guiding screen 110, having a bottom 111 and a light-discharging exit 112, in which the two semi-Fresnel lens structures 30, 30a and their corresponding light sources 20, 20a are symmetrically arranged with respect to an axis Lc, while each matching pair of light source and semi-Fresnel lens structure is arranged similar to those shown in FIG. 5. That is, the light source 20 is inclined by an angle θ and disposed at the upper fringe of side wall 113 enclosing the light-discharging exit 112 for enabling the light beams L1 of the light source 20 to be emitted by a specific angle and pour on it corresponding ridge 31 of the semi-Fresnel lens structure 30 to be reflected thereby, as the reflected light beams L2 shown in FIG. 6, and discharged out of the light-guiding screen 110 parallelly, and similarly, the light source 20a is inclined by an angle θa and disposed at the upper fringe of side wall 113 enclosing the light-discharging exit 112 for enabling the light beams L1a of the light source 20a to be emitted by a specific angle and pour on it corresponding ridge 31a of the semi-Fresnel lens structure 30a to be reflected thereby, as the reflected light beams L2a shown in FIG. 6, and discharged out of the light-guiding screen 110 parallelly. It is noted that there are different semi-Fresnel lens structure 30, 30a capable of matching to light sources 20, 20a disposed at different position and having different light emitting angle for enabling the light beams L1, L1a emitting from each light source to be reflected L2, L2a out of the light-guiding screen 110 through the same light-discharging exit 112 by a specific angle as the direction of each light beam is adjusted to pour on the semi-Fresnel lens structure by another specific angle matching the configuration of the same so as to enhance the illuminance of the resulting reflective illumination device. Specifically, when the two semi-Fresnel lens structures 30, 30a are the same and the two inclination angles θ, θa are the same, the reflected light beams L2, L2a are all discharged parallel to the axis Lc.

Figure 7:
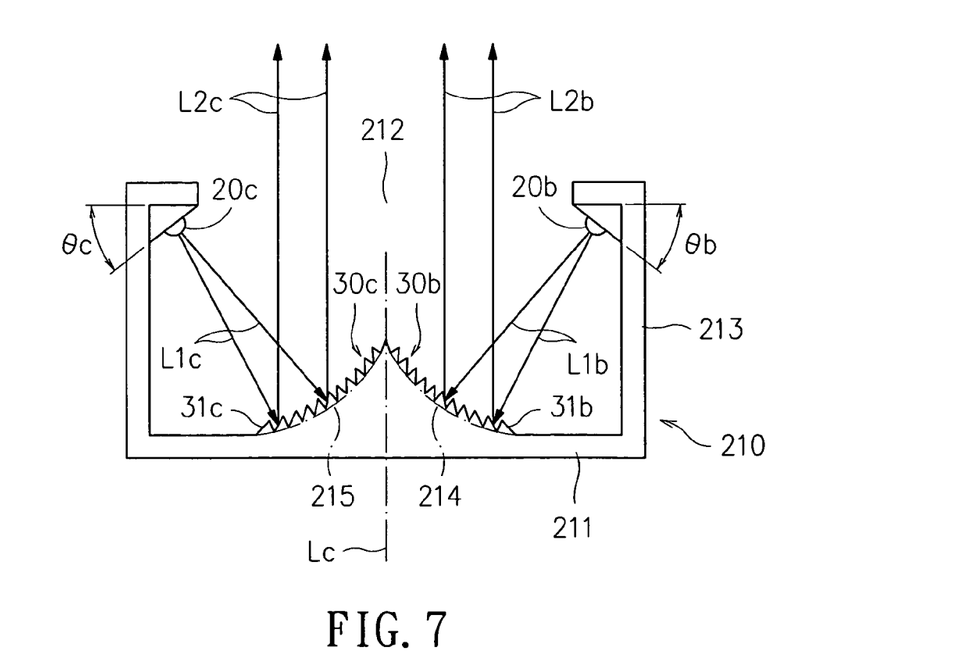
FIG. 7 is a schematic diagram illustrating a reflective illumination device according to a third embodiment of the invention.

Please refer to FIG. 7, which a schematic diagram illustrating a reflective illumination device according to a third embodiment of the invention. In FIG. 7, the light-guiding screen 210, having a bottom 211 and a light-discharging exit 212, in which the two semi-Fresnel lens structures 30b, 30c and their corresponding light sources 20b, 20c are symmetrically arranged with respect to an axis Lc. The difference between the reflective illumination device of FIG. 7 and that of FIG. 6 is that the two semi-Fresnel lens structures 30b, 30c are respectively arranged on two curved surfaces 214, 215, while the two semi-Fresnel lens structures 30b, 30c are respectively configured with a plurality of ridges 31b, 31c. For matching to the ridges 31b, 31c in respective, the light source 20b, 20c are respectively inclined by an angle θb, θc and disposed at the upper fringe of side wall 213 enclosing the light-discharging exit 212 for enabling the light beams L1b, L1c of the light source to be emitted by a specific angle, such that the light beams L1b, L1c respectively can pour on it corresponding ridges 31b, 31c of the semi-Fresnel lens structure 30b, 30c while being reflected thereby and discharged out of the light-guiding screen 210 parallel to the axis Lc. Specifically, when the two semi-Fresnel lens structures 30b, 30c are the same, the curvatures of the two curved surfaces 214, 215 are the same, and the two inclination angles θb, θc are the same, the reflected light beams L2b, L2b are all discharged parallel to the axis Lc.

Figure 8:
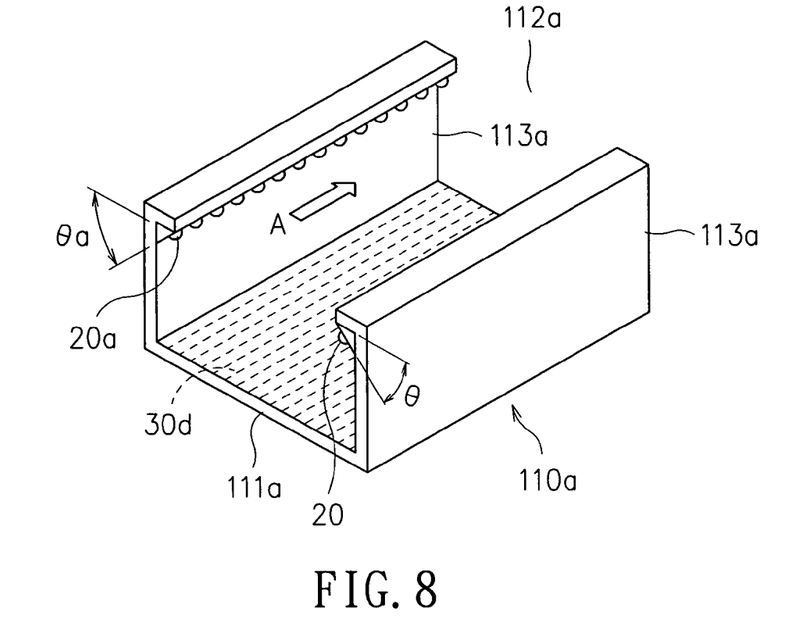
FIG. 8 is perspective view showing an embodiment of a reflective illumination device according to the present invention.
Figure 9:
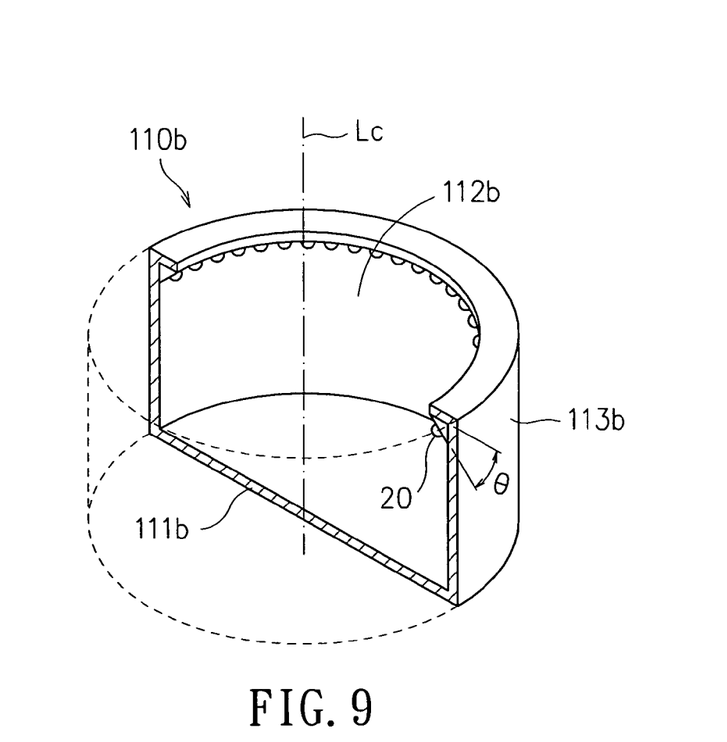
FIG. 9 is perspective view showing another embodiment of a reflective illumination device according to the present invention.

Please refer to FIG. 8 and FIG. 9, which are perspective views respectively showing two light-guiding screen of different shapes. In FIG. 8, the light-guiding screen 110a is a shaped like a box, having a bottom 111a and a light-discharging exit 112a enclosed by two symmetrically arranged side walls 113a, in which the light sources 20, 20a are respectively disposed at the upper fringes of two side walls 113a while enabling the two light sources 20, 20a to be inclined respectively by two angles θ, θa for matching the two to the semi-Fresnel lens structure 30d arranged on the bottom 111a. In FIG. 8, the semi-Fresnel lens structure 30d is represented by the dotted line, and is structured similar to those semi-Fresnel lens structure 30, 30a~30c shown in FIGS. 5~7, that the plural ridges of the semi-Fresnel lens structure 30d, disposed on the bottom 111a, are extending longitudinally corresponding to the aligning direction A of the light sources 20, 20a while being arranged parallel to each other.

In FIG. 9, the light-guiding screen 110b is shaped like a column with a pseudo center-axis Lc, having a circular bottom 111b and a light-discharging exit 112b enclosed by a tube-like side wall 113b, in which, similarly, the light sources 20 are disposed at the circular upper fringe of the side walls 113b while enabling each light sources 20 to be inclined by an angles θ for matching each light source 20 to the semi-Fresnel lens structure (not shown in FIG. 9) arranged on the bottom 111b. In FIG. 9, the semi-Fresnel lens structure is structured similar to those semi-Fresnel lens structure 30, 30a~30c shown in FIGS. 5~7, that the plural ridges of the semi-Fresnel lens structure are concentrically arranged on the bottom 111b centering the pseudo center-axis Lc.

As the embodiments illustrated in FIG. 8 and FIG. 9, it is noted that the angle of light beam emitted form each light source can be independently adjusted to match with its corresponding configuration of the semi-Fresnel lens structure for enabling the light beams emitting from different light sources to be reflected out of the illumination device by the same light-discharging angle as required, the ridges of the semi-Fresnel lens structure can be structured match with the inclination angle of its corresponding light sources so as to for enabling the light beams emitting from different light sources to be reflected out of the illumination device by the same light-discharging angle as required, such that a highly efficient reflective illumination device capable of illuminating highly collimated light beams can be achieved.

Figure 10:
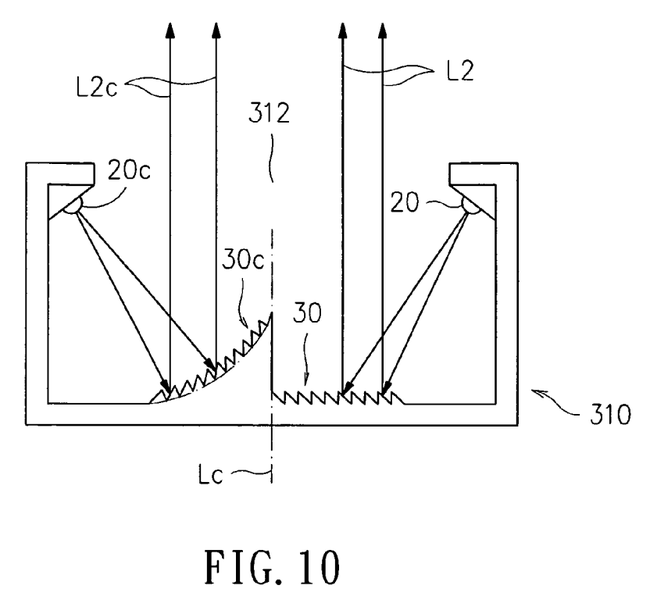
FIG. 10 is a schematic diagram illustrating a reflective illumination device according to a fourth embodiment of the invention.
Figure 11:
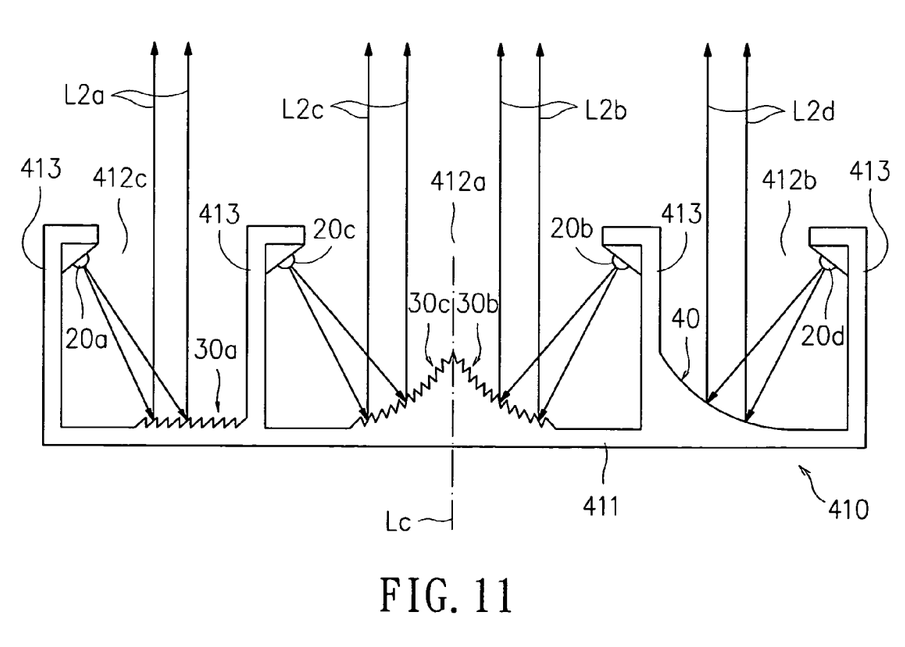
FIG. 11 is a schematic diagram illustrating a reflective illumination device according to a fifth embodiment of the invention.

Please refer to FIG. 10 and FIG. 11, which are respectively a fourth and fifth embodiments, of the invention. The illumination device shown in FIG. 10 is a structure combining half the device shown in FIG. 6 and half the device shown in FIG. 7, in which two semi-Fresnel lens structures 30, 30c are arranged inside the light-guiding screen 310 while matching respectively to the two light sources 20, 20c correspondingly so as to enable the light beams emitting from the two light sources to be reflected L2 out of the light-guiding screen 310 through the same light-discharging exit 312 parallelly. Moreover, the illumination device shown in FIG. 11 is a structure having multiple side walls 413, whereas a plurality of light-discharging exits 412a~412c are formed inside the light-guiding screen 410 respectively by the formation of different side walls 413. As seen in FIG. 11, by matching the light sources 20a~20d of different inclination angles to the semi-Fresnel lens structures 30a~30c of different configurations and a parabolic mirror 40, the reflected light beams L2a~L2d can be discharged out of their corresponding light-discharging exits 412~412c parallelly, so that a single collimated light beams discharged out of the light-guiding screen 410 can be achieved. On the other hand, by changing the matching between the inclination angles of the light sources 20a~20d and their corresponding semi-Fresnel lens structures 30a~30c, the reflected light beams L2a~L2d can be discharged out of their corresponding light-discharging exits 412~412c respectively and by various angles.

Figure 12A:
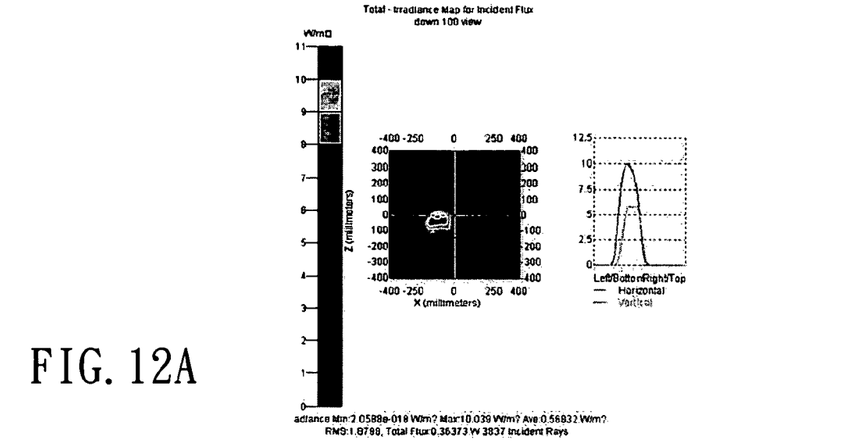
FIG. 12A to FIG. 12C show the illuminance distributions of a virtual luminaire positioned at various distance away.
Figure 12B:
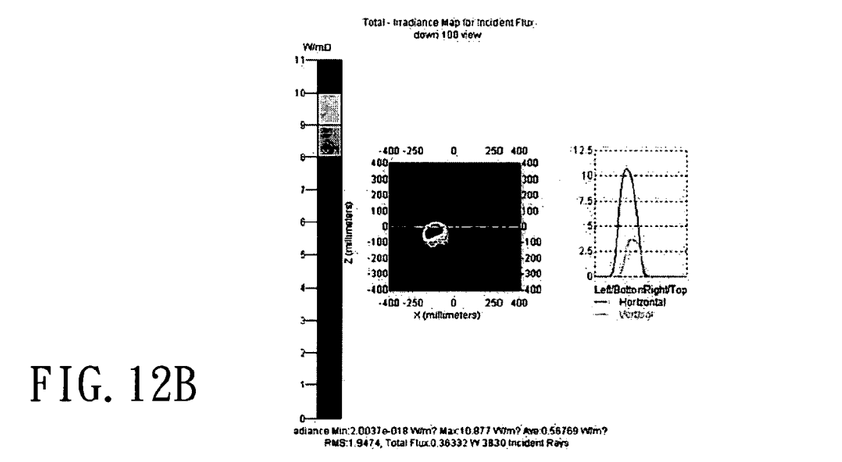
Figure 12C:
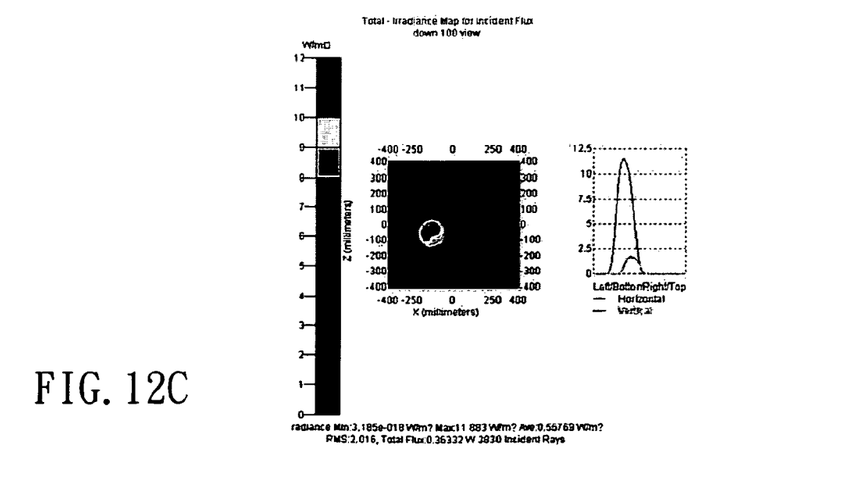

For clarity, each and every abovementioned embodiments had been verified by professional simulation softwares, such as Photopia, OptiBPM, OSLO, etc. Wherein, Photopia is a fast and accurate photometric analysis program that produces comprehensive performance evaluations for non-imaging optical designs. Photopia allows a user to produce virtual luminaires in a fraction of the time and for a fraction of the cost of physical prototypes. With computer modeling, one can test a number of design variations without altering tooling. Please refer to FIG. 12A to FIG. 12C, which show the illuminance distributions of a virtual luminaire positioned at 600 mm, 700 mm and 800 mm away from a detector in respective. As the virtual luminaire is designed to be a flat, compact structure with planar Fresnel reflecting screen simulating a parabolic mirror of 290 mm diameter with 100 mm focal length, all of the three diagrams shows that the light discharged out of the virtual luminaires positioned at 600 mm, 700 mm and 800 mm are all restricted within a circle of 250 diameter, such that the light discharged out of the so-make virtual luminaire is a collimated light.

From the above description, the advantages of the present invention can be concluded as following:

(1) Each and every light beams emitted by the light sources of the present invention can be completely reflected by the semi-Fresnel lens structure arranged inside the light-guiding screen in a parallel manner, so that a highly collimated light can be achieved.
(2) Since each and every light beams emitted by the light sources of the present invention can be completely reflected by the semi-Fresnel lens structure arranged inside the light-guiding screen, the illuminance of the resulting illumination device is improved.
(3) The shape of the light-guiding screen can be varied at will.
(4) Since a highly collimated light can be achieved, glare is prevented.
(5) The overall size of the reflective illumination device is reduced.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A reflective illumination device comprising:
    a light-guiding screen having a bottom and at least a light-discharging exit formed by an enclosure of a side wall, the bottom having at least one plain surface located in an interior of the light-guiding screen; and
    at least one directional light source, each directional light source being arranged at the side wall;
    wherein, a reflecting surface having at least a semi-Fresnel lens structure is arranged on the at least one plain surface located on the bottom of the light-guiding screen, the semi-Fresnel lens reflecting light beams emitting from each light source out of the light-discharging exit at specific angles corresponding to the direction of each light beam directed onto the semi-Fresnel lens structure, the at least one plain surface includes two plain surfaces, the profile of the reflecting surface is a formation of the two plain surfaces being symmetrically arranged with respect to an axis while the semi-Fresnel lens structures are respectively formed on the two plain surfaces.

2. The reflective illumination device of claim 1, the at least one directional light source having a plurality of light sources, an angle of a light beam emitted from each light source is positioned to match with a corresponding configuration of the semi-Fresnel lens structure, and thus the light beams emitting from the plurality of light sources are reflected out of the illumination device at a plurality of angles, in that the light beams are reflected out of the light-guiding screen by a plurality of angles.

3. The reflective illumination device of claim 1, the at least one directional light source having a plurality of light sources capable of emitting light beams by emitting angles different to each other while enabling the emitted light beams to pour onto a corresponding semi-Fresnel lens structure of the reflecting surface having a plurality of semi-Fresnel lens structures arranged thereon, and thus the light beams emitting from different light sources are reflected out of the illumination device by different angles in respective.

4. The reflective illumination device of claim 1, wherein the light-guiding screen is made of a material of light reflecting ability.

5. The reflective illumination device of claim 1, wherein a light reflecting layer is disposed on an inner wall of the light-guiding screen.

6. The reflective illumination device of claim 5, wherein the light reflecting layer is a reflective diffusion film.

7. The reflective illumination device of claim 5, wherein the light reflecting layer is formed by electro-depositing a layer of metal selected from the group consisting of aluminum, electroless nickel, and the like.

8. The reflective illumination device of claim 1, wherein, the semi-Fresnel lens structure is a structure having a plurality of ridges, the profile of each ridge is a planar surface.

9. The reflective illumination device of claim 1, wherein the ridges of the semi-Fresnel lens structures are symmetrically arranged with respect to an axis thereof.

10. The reflective illumination device of claim 1, wherein the ridges of the semi-Fresnel lens structures are extending parallel to each other.

11. The reflective illumination device of claim 1, wherein each directional light source is a light emitting diode (LED).

12. The reflective illumination device of claim 1, wherein the side wall is arranged to surround a circumference of the bottom while enabling the light-guiding screen to have a polygonal contour.

13. The reflective illumination device of claim 1, wherein the side wall is arranged to surround a circumference of the bottom while enabling the light-guiding screen to have a circular contour.

14. The reflective illumination device of claim 1, wherein the light-guiding screen is configured with a plurality of side walls enabling the an enclosure of each side wall of the plurality of side walls to form a corresponding light-discharging exit, and thus forming a plurality of light-discharging exits in the reflective illumination device, the at least one directional light source includes a plurality of light sources, each of the plurality of light sources is located on an upper portion of each of the plurality of side walls.

* * * * *